(12) United States Patent
Yao

(10) Patent No.: US 8,045,693 B2
(45) Date of Patent: Oct. 25, 2011

(54) MESSAGE RECEPTION CONFIRMATION METHOD, COMMUNICATIONS TERMINAL AND MESSAGE RECEPTION CONFIRMATION SYSTEM

(75) Inventor: Taketsugu Yao, Osaka (JP)

(73) Assignee: Oki Electric Industry Co., Ltd., Tokyo (JP)

(*) Notice: Subject to any disclaimer, the term of this patent is extended or adjusted under 35 U.S.C. 154(b) by 1547 days.

(21) Appl. No.: 11/220,703

(22) Filed: Sep. 8, 2005

(65) Prior Publication Data

US 2006/0059224 A1    Mar. 16, 2006

(30) Foreign Application Priority Data

Sep. 13, 2004 (JP) ................... 2004-265414

(51) Int. Cl.
*H04M 7/00* (2006.01)
(52) U.S. Cl. .................................. 379/220.01
(58) Field of Classification Search ............... 379/88.12, 379/220.01
See application file for complete search history.

(56) References Cited

U.S. PATENT DOCUMENTS

| | | | | |
|---|---|---|---|---|
| 7,006,449 B2 * | 2/2006 | Teraoka | ............... | 370/252 |
| 7,860,062 B2 * | 12/2010 | Voyer | ............... | 370/331 |
| 2001/0028647 A1 * | 10/2001 | Teraoka | ............... | 370/389 |
| 2007/0036286 A1 * | 2/2007 | Champlin et al. | ............... | 379/67.1 |
| 2007/0242622 A1 * | 10/2007 | Voyer | ............... | 370/254 |
| 2010/0058054 A1 * | 3/2010 | Irvine | ............... | 713/165 |
| 2010/0064354 A1 * | 3/2010 | Irvine | ............... | 726/5 |
| 2011/0039592 A1 * | 2/2011 | Haddad et al. | ............... | 455/515 |

FOREIGN PATENT DOCUMENTS

| | | |
|---|---|---|
| JP | 06-318950 A | 11/1994 |
| JP | 09-224236 A | 8/1997 |
| JP | 11-088396 A | 3/1999 |
| JP | 2000-029966 A | 1/2000 |
| JP | 2000-305621 A | 11/2000 |
| JP | 2001-053785 A | 2/2001 |

OTHER PUBLICATIONS

Yih-Chun Hu et al., "Ariadne: A Secure On-Demand Routing Protocol for Ad Hoc Networks," MobiCom'02, Sep. 23-26, 2002, 12 pages, Atlanta, Georgia.

* cited by examiner

*Primary Examiner* — Joseph T Phan
(74) *Attorney, Agent, or Firm* — Rabin & Berdo, P.C.

(57) ABSTRACT

A message sending device sends a message. A message receiving device generates reception authentication information of the message when receiving the message, and further generates reception confirmation information of the message by using the reception authentication information of the message, to send the reception confirmation information of the message to a reception confirmation information verification device. The reception confirmation information verification device verifies the received reception confirmation information. The message sending device obtains a reception confirmation of the message for the message receiving device based on the verification result. This configuration reduces a processing load in each node as much as possible for confirming whether data to large numbers of nodes under a multihop environment have been received in each node.

10 Claims, 14 Drawing Sheets

MESSAGE RECEPTION CONFIRMATION METHOD, COMMUNICATIONS TERMINAL AND MESSAGE RECEPTION CONFIRMATION SYSTEM

CROSS REFERENCE TO RELATED APPLICATIONS

The disclosure of Japanese Patent Application No. JP2004-265414, filed on Sep. 13, 2004, entitled "MESSAGE RECEPTION CONFIRMATION METHOD, COMMUNICATIONS TERMINAL AND MESSAGE RECEPTION CONFIRMATION SYSTEM". The contents of that application are incorporated herein by reference in their entirety.

BACKGROUND OF THE INVENTION

The present invention relates to a message reception confirmation method, a communications terminal and a message reception confirmation system. The present invention is applicable to the case, for example, in which a server broadcasts a message to sensor nodes and confirm the reception, in a system such as sensor network system configured by a server for performing concentrated control for the system and by large numbers of sensor nodes configured at low cost.

DESCRIPTION OF THE RELATED ART

For example, when sending important information such as upload data of software from a server to a node, there is a desire that the server confirms that correct data has been sent to the node.

In carrying out the reception confirmation when broadcasting from server to node in a multihop communication environment, there is the following problem. In broadcasting from server to node in a multihop communication environment, returning a reception confirmation message from all nodes having received the massage to the server individually increases communication overhead and the load on server. Since plural nodes relay between a source device and a destination device in the multihop communication environment, the reception confirmation message from the nodes have no credibility, in which an unauthorized relay node may forge the reception confirmation message.

In the page 5 of "Yih-Chun Hu, Adrian Perrig, David B. Johnson, "Ariadne: A Secure On-Demand Routing Protocol for Ad Hoc Networks," MobiCom '02, Sep. 23-26, 2002, Atlanta, Ga., USA", a method of realizing a secure routing is described. In this article, there is a description of Ariadne Route Discovery using MACs method as a secure routing method in which an arbitrary node shares keys with all of other nodes one-to-one. In this method, when the node, which has received a route request broadcasted by a node with a desire of generating a route to a target node, links: (1) own ID information; (2) a MAC (Message Authentication Code, generated by using a key shared with the target node one-to-one) for the route request; and (3) relay authentication information of the previous hop node to each other and make subjected to hash function and adds the output value to a message to the next hop node as relay authentication information on its own, in order to authenticate that the node has relayed for the target node of the route request.

When receiving the route request with the relay authentication information added, the target node can verify that the information of node relayed the route request has no falsification by using the key shared with each node. When the verification succeeds, the target node returns the relayed node information and the MAC that has generated by the key shared with a route request generating node one-to-one, to the route request generating node, as a route reply. This allows the route request generating node obtain information on a secure route to the target node.

The relay authentication information output from each relay node, which is the output value of the hash function, does not have large data size. And since the relay authentication information is overlapped in each node, the data size of relay authentication information does not depend on the number of relay nodes on the route and becomes constant.

SUMMARY OF THE INVENTION

The sensor network system now assumed is configured by a server for performing concentrated control for the system and by large numbers of sensor nodes configured at low cost. Since the sensor node, which is generally driven by a battery, has a limited amount of resources, it is preferable that the load on the sensor node is light.

When the related art is applied to the reception confirmation of broadcast message of server, the reception confirmation of the broadcast message of the server (route request in the related art) is verified on the sensor node (target node in the related art) side and reported to the server. In this case, the low-cost sensor node is to take the calculation load for verification and it is necessary for the verifying sensor node to share keys with at least all sensor nodes assumed to exist on the route from the server to the sensor node for verification.

When the sensor node reports the verification result of reception confirmation to the server in, for example, a tree structure, a general network structure of the sensor network, the calculation for the verification of the reception confirmation in an upstream node may be overlapped with the calculation in a downstream node, which is not efficient.

In the related art, as described above, although the data size of the reception confirmation information (relay authentication information in the related art) is not large and does not depend on the number of hops, it is not preferable to apply to the reception confirmation of the broadcast message of the server in the sensor network as it is, and it is necessary to prepare a message reception confirmation method and system, and a communications terminal that are more suitable for the sensor network system.

In the first aspect of the present invention, to solve the aforementioned problem, there is provided a message reception confirmation method in which a message sending device obtains a reception confirmation of a message sent to a message receiving device under a multihop communication environment, comprising: a first step of sending the message from the message sending device; a second step of the message receiving device's generating reception authentication information of the message; a third step of the message receiving device's generating reception confirmation information of the message by using the reception authentication information of the message; a fourth step of the message receiving device's sending the reception confirmation information of the message to a reception confirmation information verification device; a fifth step of the reception confirmation information verification device's verifying the reception confirmation information received; and a sixth step of the message sending device's obtaining the reception confirmation of the message to the message receiving device based on the result of verification in the fifth step.

In the second step, the reception authentication information of the message may be generated by using a key shared by the message receiving device and the reception confirmation information verification device.

In the second step, a MAC for the message may be generated as the reception authentication information of the message by using the key shared by the message receiving device and the reception confirmation information verification device.

In the third step, the reception confirmation information may be generated by reception confirmation information of zero or more of other message receiving devices and the reception confirmation information on the message receiving device's own.

In the third step, the reception confirmation information may be generated by setting the reception confirmation information of zero or more of other message receiving devices and the reception confirmation information on the message receiving device's own as an input to generate a hash value thereof.

In the fourth step, the reception confirmation information of the message receiving device may be sent after receiving the reception confirmation information of zero or more of other message receiving devices.

The other message receiving devices using the reception confirmation information sent by the message receiving device may be are child nodes of the message receiving device in a tree structure.

In the fourth step, the reception confirmation information may be sent to the reception confirmation information verification device after adding zero or more of node discrimination information to the reception confirmation information of the message receiving device performing the fourth step.

The node discrimination information added to the reception confirmation information of the message receiving device may be discrimination information of a child node that has not obtained the reception confirmation information in the child nodes of the message receiving device in the tree structure providing a multihop communication environment, and, in the third step, the reception confirmation information of the message receiving device is generated without using the reception confirmation information generated by the child node.

In the fifth step, the reception confirmation information verification device may calculate the reception confirmation information assumed to be received in advance before receiving the reception confirmation information, and verifies the reception confirmation information calculated by comparing with the reception confirmation information received.

In the fifth step, the reception confirmation information may be verified by calculating the reception confirmation information assumed to be received with nodes eliminated from zero or more of the node discrimination information added to the reception confirmation information received and by comparing with the reception confirmation information received.

The reception confirmation information verification device performing the fifth step may share a key with all message receiving devices verifying reception confirmation and may know by what route the reception confirmation information generated by these message receiving devices is sent to the reception confirmation information verification device, and in the fifth step, these message receiving devices may calculate the reception confirmation information assumed to be received in the same manner as generating the reception confirmation information.

The message sending device performing the sixth step may obtain the reception confirmation of the message from the reception confirmation information verification device in such a way that falsification of information and spoofing cannot be performed.

In the sixth step, the reception confirmation of the message is obtained and zero or more message sending devices in which the message reception cannot be confirmed may be detected.

The reception confirmation information verification device and the message sending device may be the same.

In the second aspect of the present invention, there is provided a communications terminal for verification for verifying reception confirmation information that is sent from a message receiving device and that indicates whether a message sent from a message sending device is received by the message receiving device under a multihop communication environment, comprising: a receiving device information managing part for managing information of the message receiving device; a receiving part for receiving the reception confirmation information; and a verifying part for verifying the reception confirmation information received.

In the third aspect of the present invention, there is provided a communications terminal corresponding to a message receiving device for receiving a message sent from a message sending device and for generating reception confirmation information when receiving under a multihop communication environment, comprising: a receiving part for receiving the message; a reception authentication information generating part for generating reception authentication information of the message; an adjacent device information managing part for managing information of an adjacent communications terminal; a reception confirmation information generating part for generating the reception confirmation information of the message; and a reception confirmation information sending part for sending the reception confirmation information.

The message reception confirmation system in the fourth aspect of the present invention comprises a communications terminal for verification in the second aspect of the invention and a communications terminal corresponding to a message receiving device in the third aspect of the invention.

According to the present invention as described above, there can be provided a message reception confirmation method and system and a communications terminal that reduce the processing load in a message receiving device for the reception confirmation of message under a multihop communication environment, and that are more suitable for such a network system including large numbers of nodes as sensor network system.

BRIEF DESCRIPTION OF THE DRAWINGS

The above and other features of the invention and the concomitant advantages will be better understood and appreciated by persons skilled in the field to which the invention pertains in view of the following description given in conjunction with the accompanying drawings which illustrate preferred embodiments.

DETAILED DESCRIPTION OF THE PREFERRED EMBODIMENTS

(A) First Embodiment

Hereinafter, the first embodiment of a message reception confirmation method, a communications terminal and a message reception confirmation system according to the present invention will be described in reference to the accompanying drawings.

In the first embodiment, a server performing concentrated control holds authentication keys (a key shared by each node with the server one-to-one) of all nodes managed by the server, and routing tables to all nodes. For broadcast data of the server, the node generates an MAC for the data received by using the key shared with the server one-to-one, and sends reception confirmation information on it own with a hash function generated by linking the generated MAC to reception confirmation information received from all child nodes of the node, to a parent node. Receiving the reception confirmation information on the data broadcasted, the server verifies whether correct data has been sent or not, or whether node information managed by the server has changed or not.

(A-1) Structure of the First Embodiment

Figure 1:
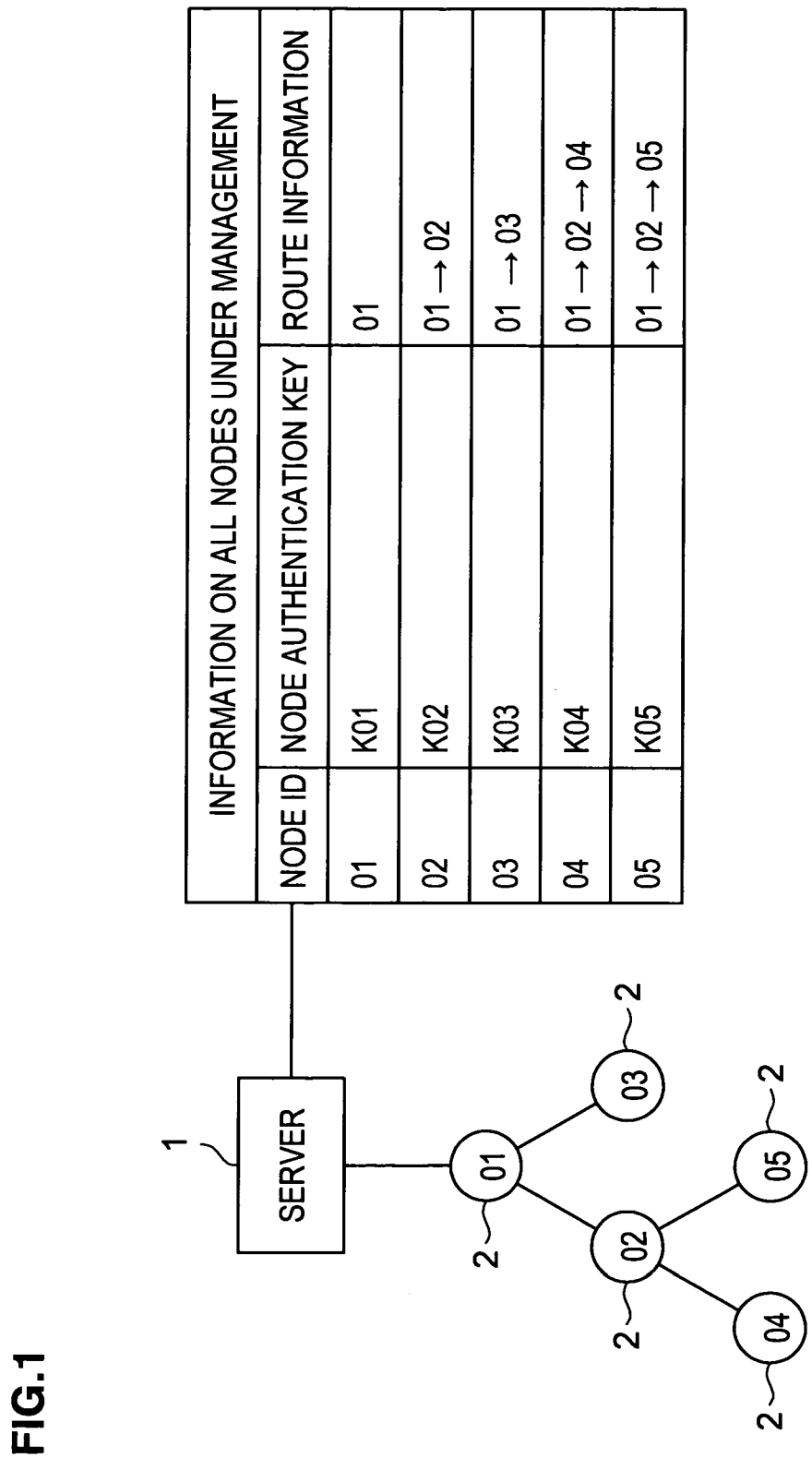
FIG. 1 is an explanatory diagram showing a configuration example of a network for a message reception confirmation system and node information managed by a server in the first embodiment.

The network assumed by the message reception confirmation system in the first embodiment has a configuration with many (five in FIG. 1) nodes 2 connected to a server 1 to be a tree structure, as shown in FIG. 1. It should be noted that the server 1 and each node 2 correspond to a communications terminal. The server 1 has all node information under management shown in the table of FIG. 1.

Figure 2:
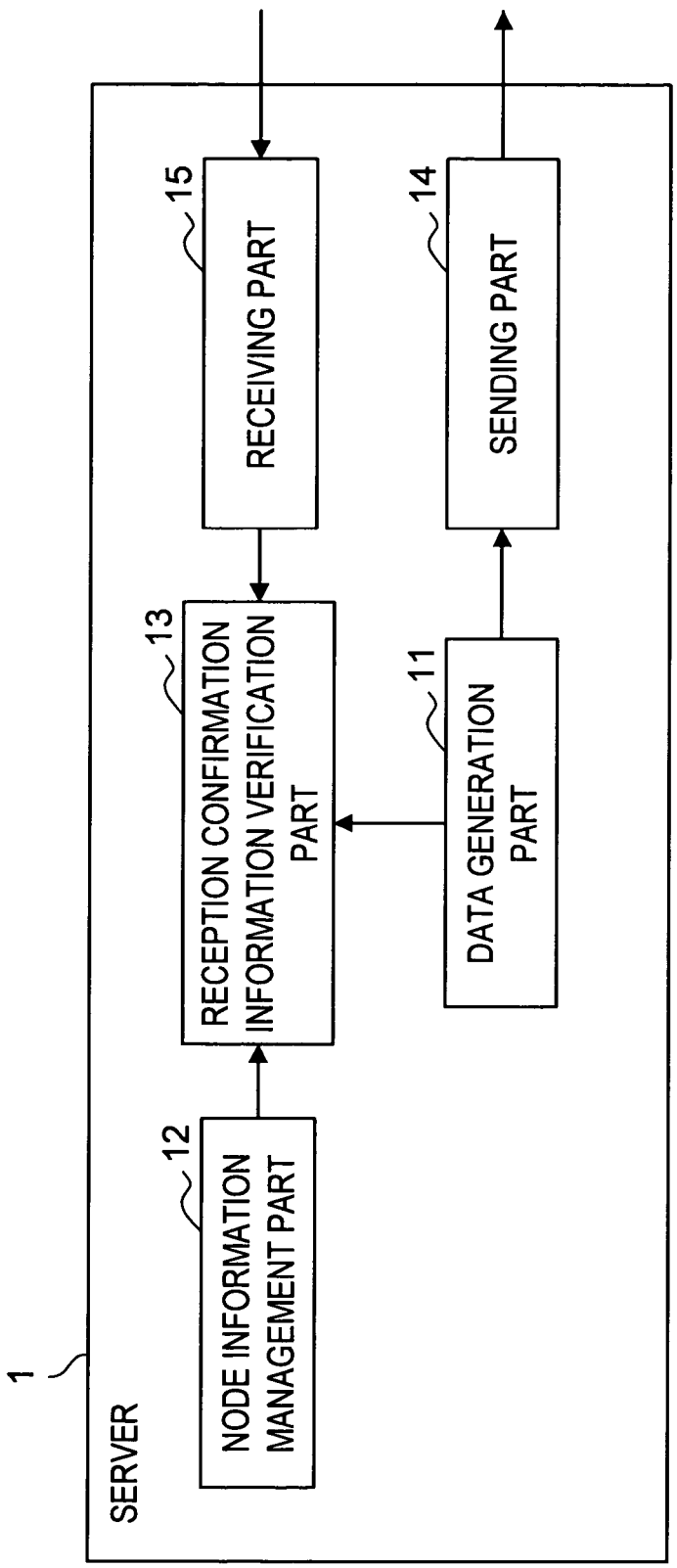
FIG. 2 is a block diagram showing a detailed configuration of the server in the first embodiment.

FIG. 2 is a block diagram showing an internal configuration of the server (sender of the broadcast data) 1 in the first embodiment.

The server 1 includes a data generation part 11, a node information management part 12, a reception confirmation information verification part 13, a sending part 14 and a receiving part 15.

The data generation part 11 generates data to be broadcasted and provides the generated data to the sending part 14 and the reception confirmation information verification part 13.

The node information management part 12 manages the node information under management and provides the managed node information to the reception confirmation information verification part 13. Here, the node information is configured by node ID, node authentication key and route information to the node, as shown in the table of FIG. 1. The node ID is the information used to discriminate a node, and, for example, 64 bit-IEEE address is applicable thereto. The node authentication key is the key information shared by the server 1 with each node 2 one-to-one and has a length of, for example, 128 bits. The route information to the node suffices if the route information between the server 1 and all nodes can be understood. The data form of route information to the node is not limited.

The reception confirmation information verification part 13 verifies whether the broadcasted data have reached all nodes under management, based on the data provided by the data generation part 11, the node information provided by the node information management part 12 and the reception confirmation information provided by the receiving part 15. The reception confirmation information verification part 13 has MAC generation algorithm and hash function. The MAC generation algorithm is, for example, CBC-MAC (Cipher Block Chaining-MAC) using block cipher such as AES cipher and the hash function is, for example, MD5 (Message Digest 5) and SHA-1 (Secure Hash Algorithm-1). The MAC generation algorithm and the hash function are required to be determined in advance between the server 1 and the nodes 2.

Figure 4:
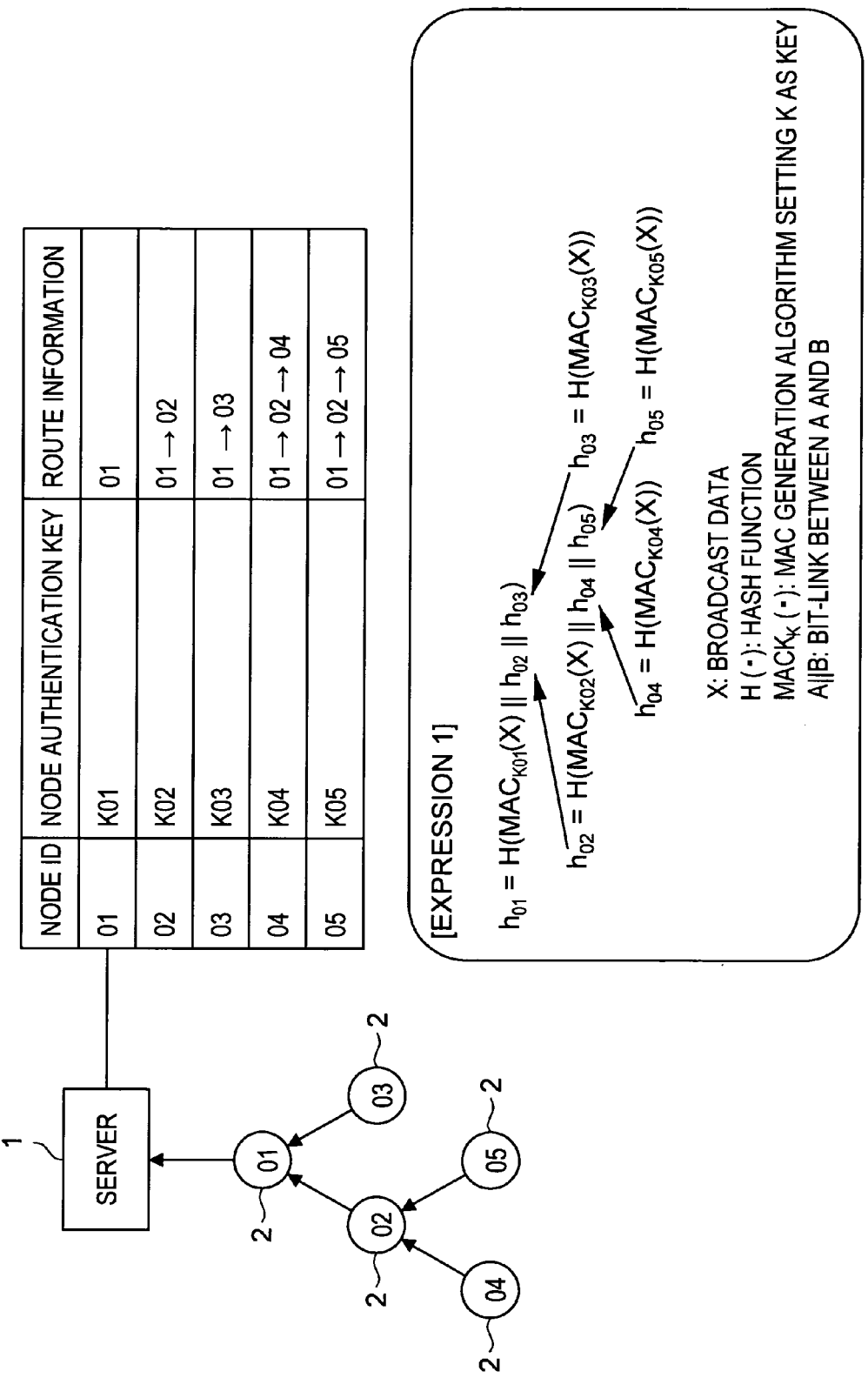
FIG. 4 is an explanatory diagram of an arithmetic expression performed by a reception confirmation information verification part in the server in the first embodiment.

The reception confirmation information verification part 13 calculates the reception confirmation information assumed to be returned from the adjacent node, in accordance with the route information to the node under management provided by the node information management part 12. For example, when the server 1 holds the node information shown in the table of FIG. 1, the calculation in the reception confirmation information verification part 13 is performed as follows by using the data from the data generation part 11 and the node authentication key; $h_{01}=H(MAC_{K01}(X)\|h_{02}\|h_{03})$, expression 1 in FIG. 4. In other words, with regard to an end node, the MAC for a broadcast data text calculated by using the authentication key of the end node is subjected to the hash function while, with regard to a router node, the result of linking the MAC for data X calculated by using the authentication key of the router node to the calculation result in one or plural other nodes relayed by the node is subjected to the hash function. In this manner, the calculation result in each node is overlapped with each other to obtain the final calculation result.

Here, the router node indicates a node to be a relay node to one or plural nodes, such as a parent node in a tree structure, while the end node indicates a node not to be a relay node to the next hop node, such as a node without a child node in a tree structure.

According to whether the calculation result in the reception confirmation information verification part 13 matches the reception confirmation information from the receiving part 15 or not, it can be understood whether the correct data broadcasted by the server 1 has reached the node under management or not.

The sending part 14 broadcasts the data from the data generation part 11 to the node under management.

The receiving part 15 provides the reception confirmation information received from the adjacent node under management to the reception confirmation information verification part 13. Here, "adjacent" indicates the range between which data can be sent/received in one hop.

Figure 3:
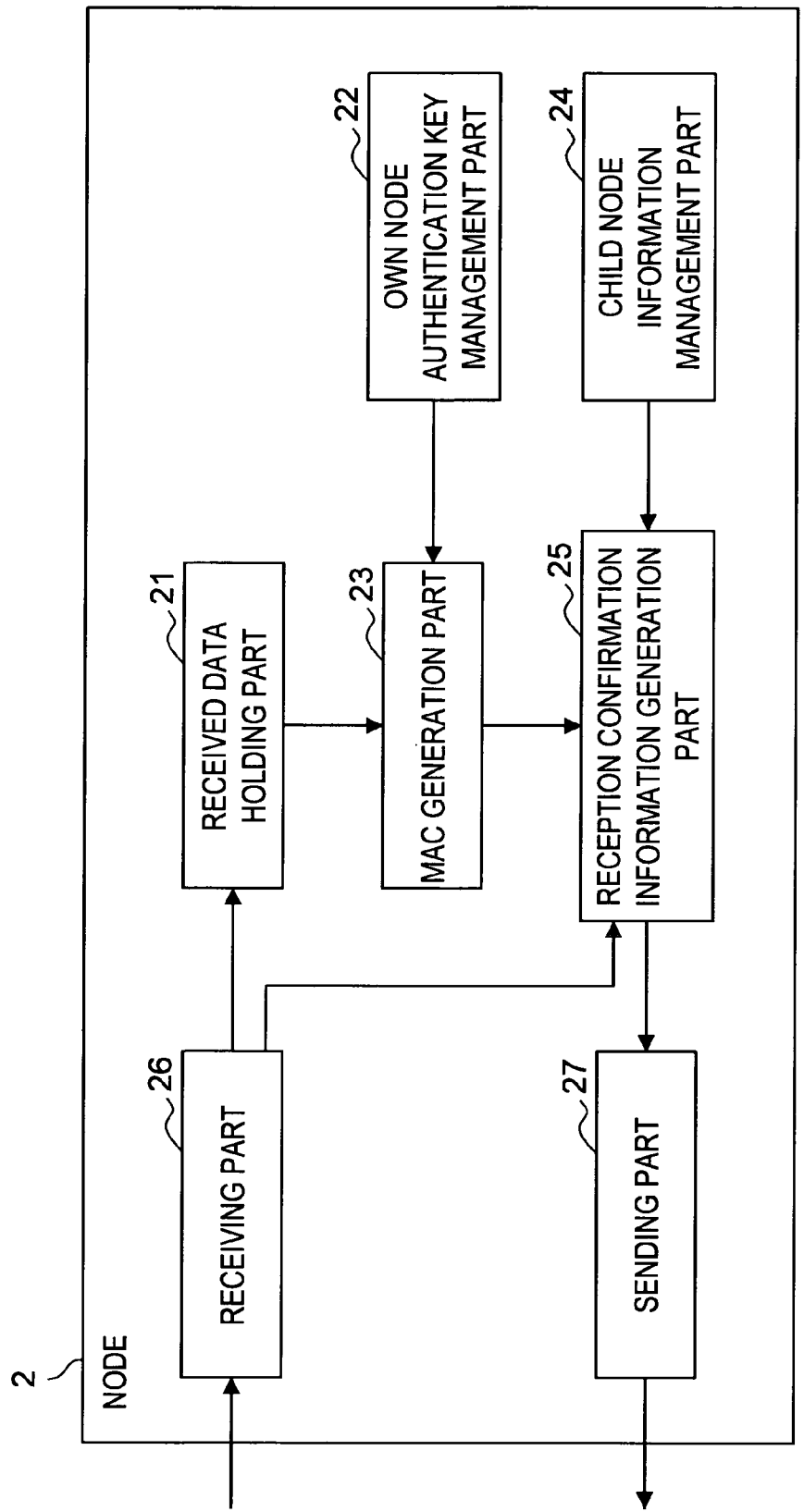
FIG. 3 is a block diagram showing a detailed configuration of a node in the first embodiment.

FIG. 3 is a block diagram showing a detailed configuration of each node (receiver of the broadcast data) 2 in the first embodiment. In addition, FIG. 3 describes components in view of the configuration to notify to the server side that each node has received the broadcast data, so there is omitted a configuration in which the broadcast data is sent to be relayed to the child node side.

Each node 2 includes a received data holding part 21, own node authentication key management part 22, an MAC generation part 23, a child node information management part 24, a reception confirmation information generation part 25, a receiving part 26 and a sending part 27.

The received data holding part 21 holds the broadcast data of the server 1 provided from the receiving part 26 and provides the held data to the MAC generation part 23.

The own node authentication key management part 22 manages a key shared by the server 1 with the corresponding node one-to-one and provides the managed key to the MAC generation part 23. Here, the managed key is used as the authentication key to make the server 1 authenticate the corresponding node.

The MAC generation part 23 generates the MAC for the broadcast data based on the broadcast data of the server 1 from the received data holding part 21 and the authentication key of the corresponding node from the own node authentication key management part 22, and provides the generated MAC to the reception confirmation information generation part 25. The MAC generation part 23 has the MAC generation algorithm, which has been determined in advance with the server.

According to whether the corresponding node is the router node or the end node, the child node information management part 24 manages the information on the node with the corresponding node relayed in the case of the router node, and provides the managed information to the reception confirmation information generation part 25. No management of the node information in the child node information management part 24 means that the corresponding node is the end node while management of the node information in the child node information management part 24 means that the corresponding node is the router node. The information managed by the child node information management part 24 is the node ID and the information indicating whether the node is the router node or the end node.

The reception confirmation information generation part 25 generates the reception confirmation information of the corresponding node based on the information from the child node information management part 24, the MAC from the MAC generation part 23 and the reception confirmation information from the receiving part 26 generated by the child node, and provides the generated reception confirmation information to the sending part 27. The reception confirmation information generation part 25 has the hash function. The hash function held by the reception confirmation information generation part 25 has been determined in advance with the server 1. Based on the information from the child node information management part 24 that the corresponding node is the end node, the reception confirmation information generation part 25 performs the hash function for the MAC from the MAC generation part 23, and provides it, as the reception confirmation information of the corresponding node, to the sending part 27. Also, based on the information from the child node information management part 24 that the corresponding node is the router node and based on the ID of one or plural child nodes, the reception confirmation information generation part 25 performs the hash function for the result of linking the MAC from the MAC generation part 23 to the reception confirmation information of all child nodes provided from the receiving part 26, and provides it, as the reception confirmation information of the corresponding node, to the sending part 27. Here, the order of linking of the reception confirmation information in the case of providing the reception confirmation information from plural child nodes is not especially specified. For example, the order of linking may be determined according to the size of the node ID. However, it is necessary to follow the specification determined in advance with the server 1.

The receiving part 26 provides the broadcast data from the server 1 to the received data holding part 21 and the reception confirmation information from the child node to the reception confirmation information generation part 25.

The sending part 27 provides the reception confirmation information of the corresponding node from the reception confirmation information generation part 25 to its own parent node (the server in the case that the parent is the server).

(A-2) Operation of the First Embodiment

Next, the operation of the message reception confirmation system in the first embodiment (message reception confirmation method) will be described.

The operation of the message reception confirmation system in the first embodiment consists of roughly three-stage operation (S101 to S103).

Figure 5:
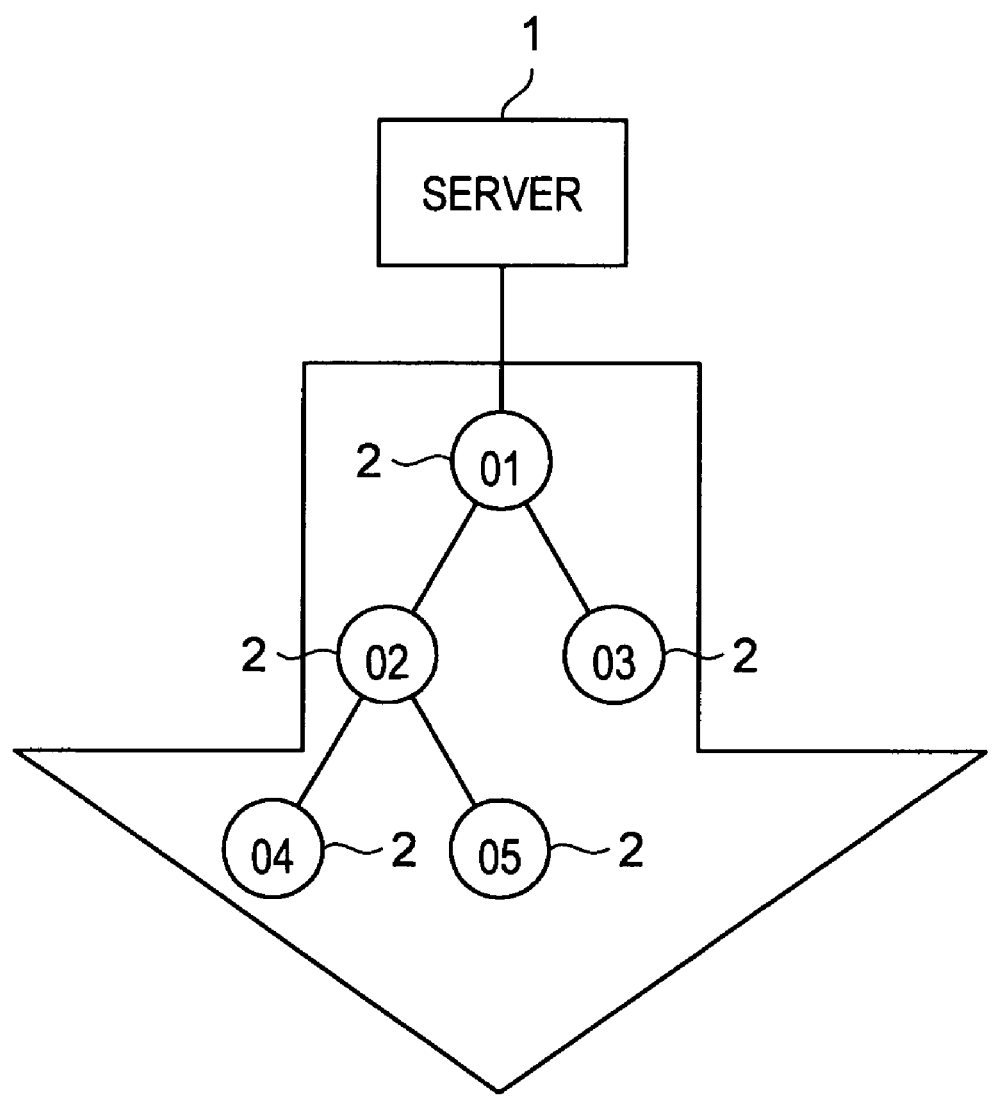
FIG. 5 is an explanatory diagram of an operation in the first stage in the message reception confirmation system in the first embodiment.

First Stage S101 (server broadcasts data) (see FIG. 5)

The server 1 generates broadcast data X in the data generation part 11 and broadcasts to the node 2 under management through the sending part 14.

Figure 6:
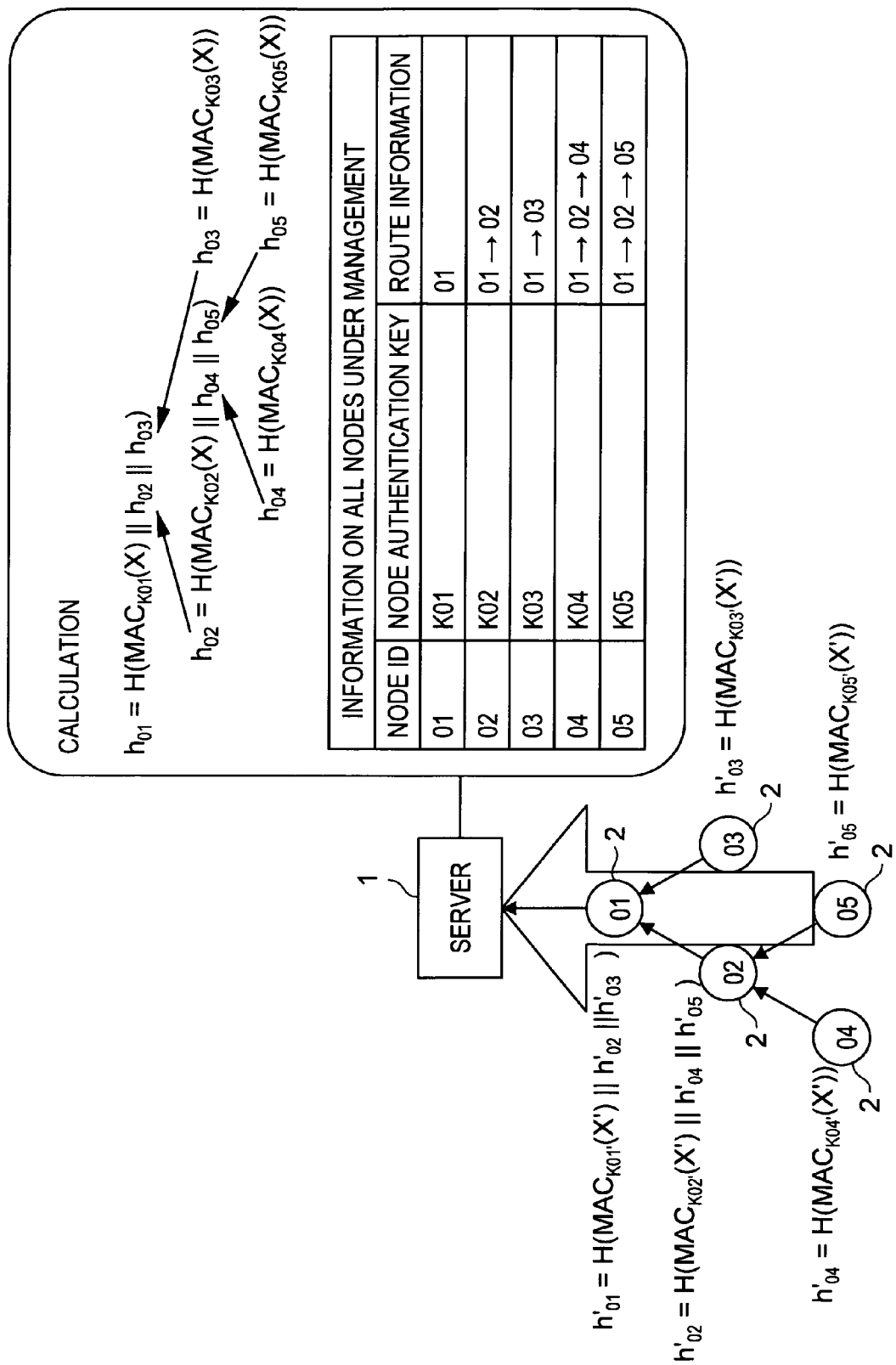
FIG. 6 is an explanatory diagram of an operation in the second stage in the message reception confirmation system in the first embodiment.

Second Stage S102 (server calculates reception confirmation information assumed to be returned) (node returns reception confirmation information to server while overlapping) (see FIG. 6)

In the reception confirmation information verification part 13, the server 1 calculates the reception confirmation information assumed to be returned from the adjacent node, from the broadcast data X from the data generation part 11, the node ID from the node information management part 12, the node authentication key and the route information.

Each node 2, on the other hand, holds the broadcast data X from the server 1 received by the receiving part 26 in the received data holding part 21, and, in the MAC generation part 23, the broadcast data X from the server 1 provided by the received data holding part 21 and the authentication key of the corresponding node provided by the own node authentication key management part 22 are input to generate the MAC for the received data to be sent to the reception confirmation information generation part 25.

Also, each node 2 judges in a reception confirmation information generation part 25 whether the node 2 itself is the end node or the router node, based on the information from the child node information management part 24.

In the case of being the end node (nodes of ID 03 to 05 in the network configuration in FIG. 1), each node 2 sends the hash value with the MAC from the MAC generation part 23 subjected to the hash function, as the reception confirmation information on its own, from the sending part 27 to the parent node.

On the other hand, in the case of being the router node (nodes of ID 01 and 02 in the network configuration in FIG. 1), since the reception confirmation information on all child nodes are provided through the receiving part 26, each node 2 sends the hash value in which the result of linking the MAC from the MAC generation part 23 to the reception confirmation information of all child nodes is subjected to the hash function, as the reception confirmation information on its own, from the sending part 27 to the parent node.

In the end node of ID 04 in FIG. 6, for example, the MAC generation part 23 generates the MAC for the received data by inputting the broadcast data X (considering wrong sending, there is indicated as X' in FIG. 6) from the server 1 and an authentication key K04' of the corresponding node, and the reception confirmation information generation part 25 has performed a hash function H (•) for the MAC and generates the hash value, and the sending part 27 sends the hash value as the reception confirmation information to the parent node (node 02).

In the router node of ID 02 in FIG. 6, for example, the reception confirmation information generation part 25 performs the hash function H (•) for the result of linking the MAC from the MAC generation part 23 to the reception confirmation information $h'_{04}$ and $h'_{05}$ of all child nodes (04 and 05) to generate the hash value, and sends the hash value, as the reception confirmation information, from the sending part 27 to the parent node.

Figure 7:
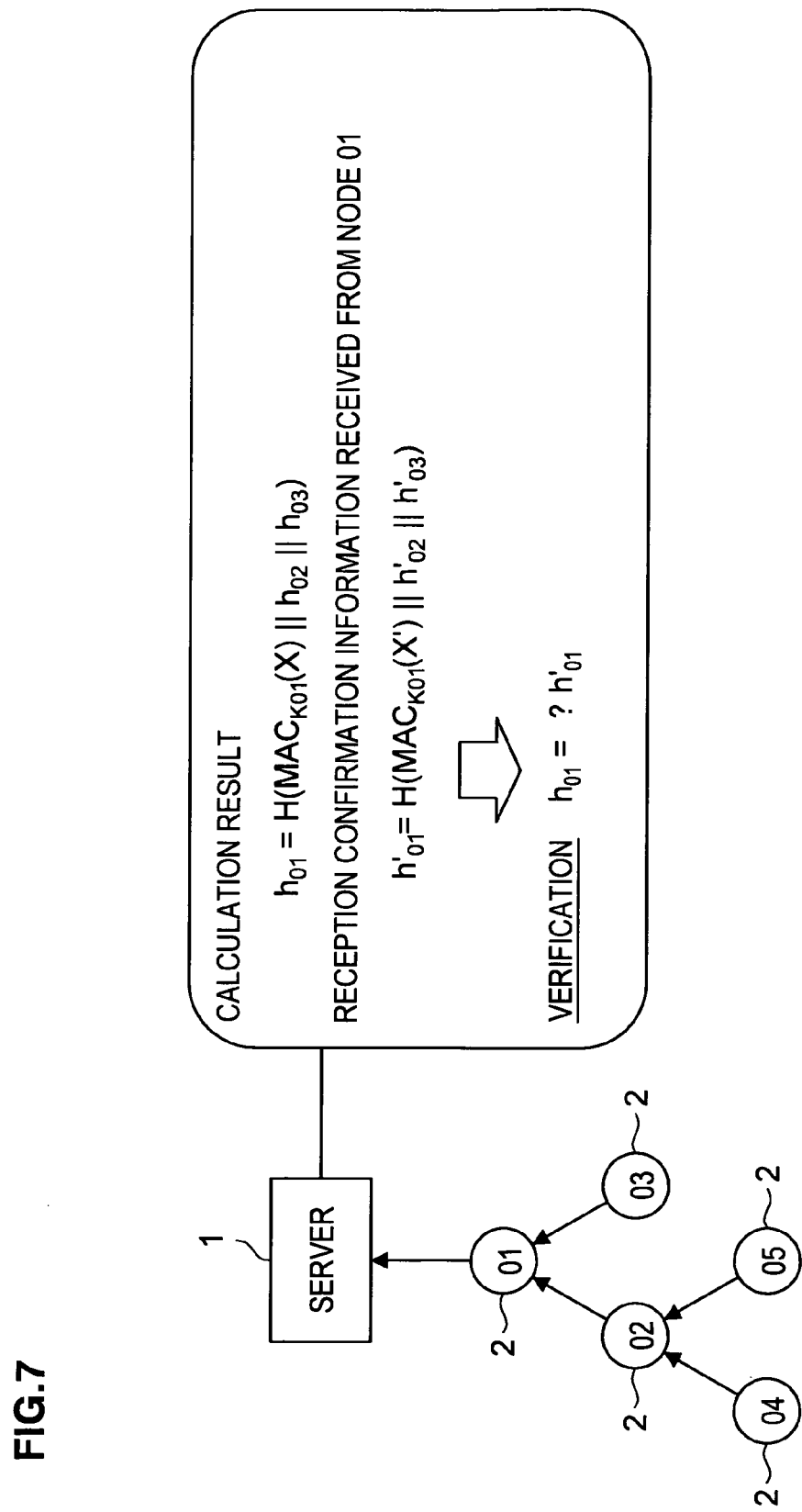
FIG. 7 is an explanatory diagram of an operation in the third stage in the message reception confirmation system in the first embodiment.

Third Stage S103 (server verifies reception confirmation information) (see FIG. 7)

The reception confirmation information verification part 13 of the server 1 verifies whether the reception confirmation information calculated in the second stage matches the reception confirmation information from the adjacent node provided through the receiving part 15.

(A-3) Advantage of the First Embodiment

According to the message reception confirmation device, system and method in the first embodiment, the following advantage can be attained.

Since each node returns the reception confirmation information to the broadcast data (message) sent by the server and the server verifies the reception confirmation information, the node with small amount of calculation resources is not required to suffer the load of calculation for verification, which can be taken by the server with enough calculation resources. Verification on the server's side eliminates the necessity for each node to share the keys with all nodes one-to-one on the route from the server to each node and it suffices if each server shares the key with the server for performing concentrated control for the system one-to-one.

The reception confirmation information returned from each router node is overlapped with the reception confirmation information of the child node of the router node. Accordingly, plural child nodes make it possible to reduce the number of communications to relay the reception confirmation information on the router node's side, compared with the case where each child node returns the reception confirmation information to the server individually. In addition, each node does not generate the overlapped reception confirmation information, which makes efficient.

The server can understand whether the broadcast data broadcasted from the server itself has reached correctly the node managed by the server itself or not. In the case of sending important data such as upload data of software, for example, the server can understand whether the correct data has reached the node under management or not.

The server can understand whether the node information managed by the server itself has changed or not. For example, the server can understand whether the route between the server and the node has the same information as the route information understood by the server or not.

Since the reception confirmation information, which is overlapped in plural nodes, is returned to the server, it is difficult for an attacker (third party for the system) to forge. In order for the attacker to forge the reception confirmation information, it is necessary to know the authentication key of all nodes with the reception confirmation information overlapped.

The overlapped reception confirmation information in plural nodes makes it necessary to know the authentication key of all downstream nodes from an unauthorized relay node, in order for the node to forge the reception confirmation. Accordingly, the larger the number of nodes existing downstream (for example, the router node near the server) becomes, the more it becomes difficult to forge the reception confirmation information thereof.

(B) Second Embodiment

Hereinafter, the second embodiment of a message reception confirmation device, method and system according to the present invention will be described in reference to the accompanying drawings.

In the first embodiment as described above, it is assumed that the node returns the reception confirmation information to the broadcast data from the server without fail. However, there may be the case, for example, where the reception confirmation information is not returned for such a reason as failure of node and not existing of the node at the proper location.

In the second embodiment, the router node's addition of the ID of child node that could not obtain the reception confirmation information to the reception confirmation information makes it possible for the server to detect the node with data possibly undelivered.

(B-1) Structure of the Second Embodiment

Figure 8:
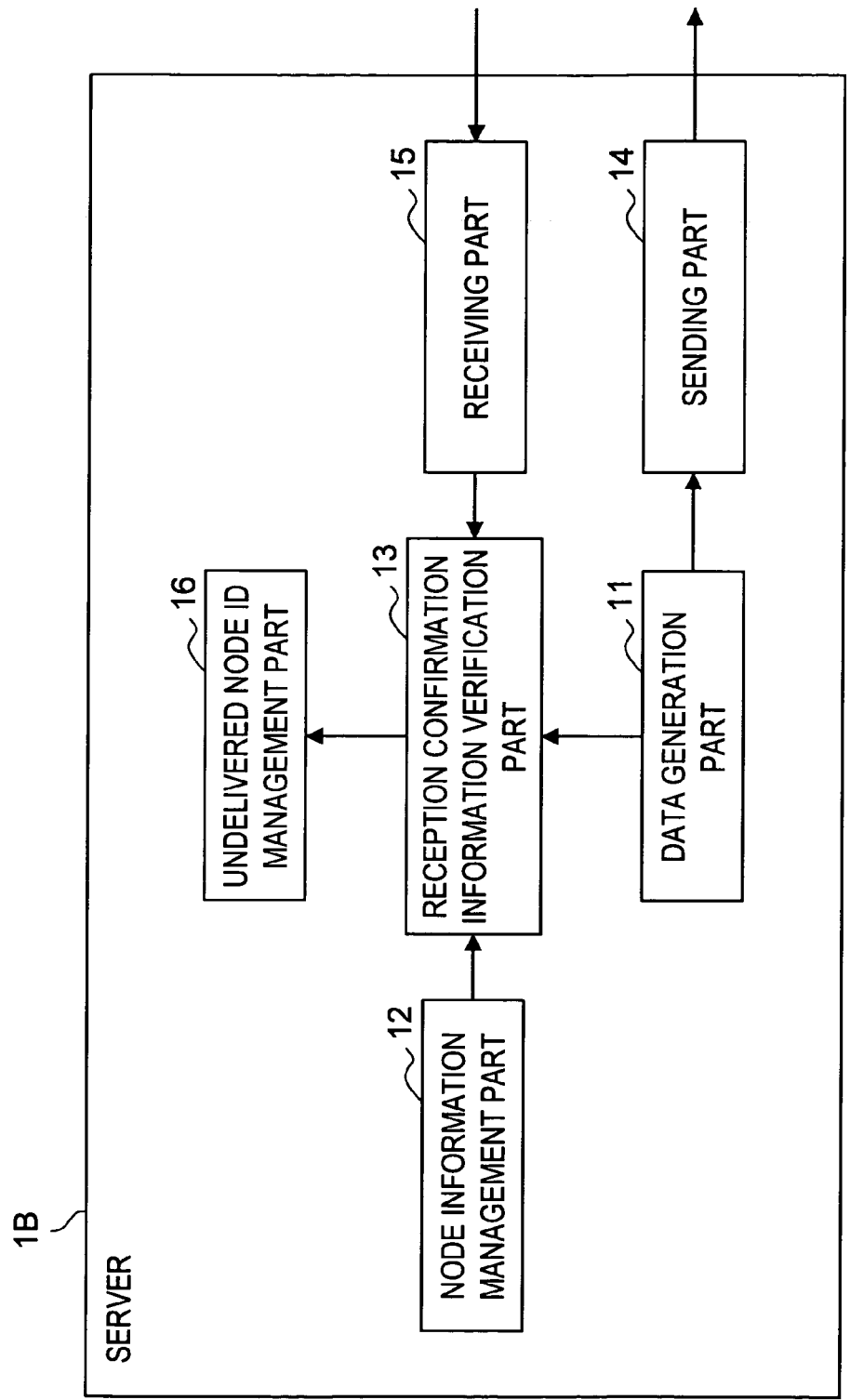
FIG. 8 is a block diagram showing a detailed configuration of a server in the second embodiment.

FIG. 8 is a block diagram showing a configuration of a server (sender of broadcast data) 1B in the second embodiment. Same reference numerals are attached to the same and corresponding parts as FIG. 2 in the first embodiment.

A server 1B in the second embodiment includes a data generation part 11, a node information management part 12, a reception confirmation information verification part 13, an undelivered node ID management part 16, a sending part 14 and a receiving part 15. Compared with the first embodiment, the undelivered node ID management part 16 is added and the functions of the reception confirmation information verification part 13 and the receiving part 15 are slightly different. Hereinafter, the components different from the first embodiment will be described.

The reception confirmation information verification part 13 in the second embodiment is different from the reception confirmation information verification part in the first embodiment.

Figure 10:
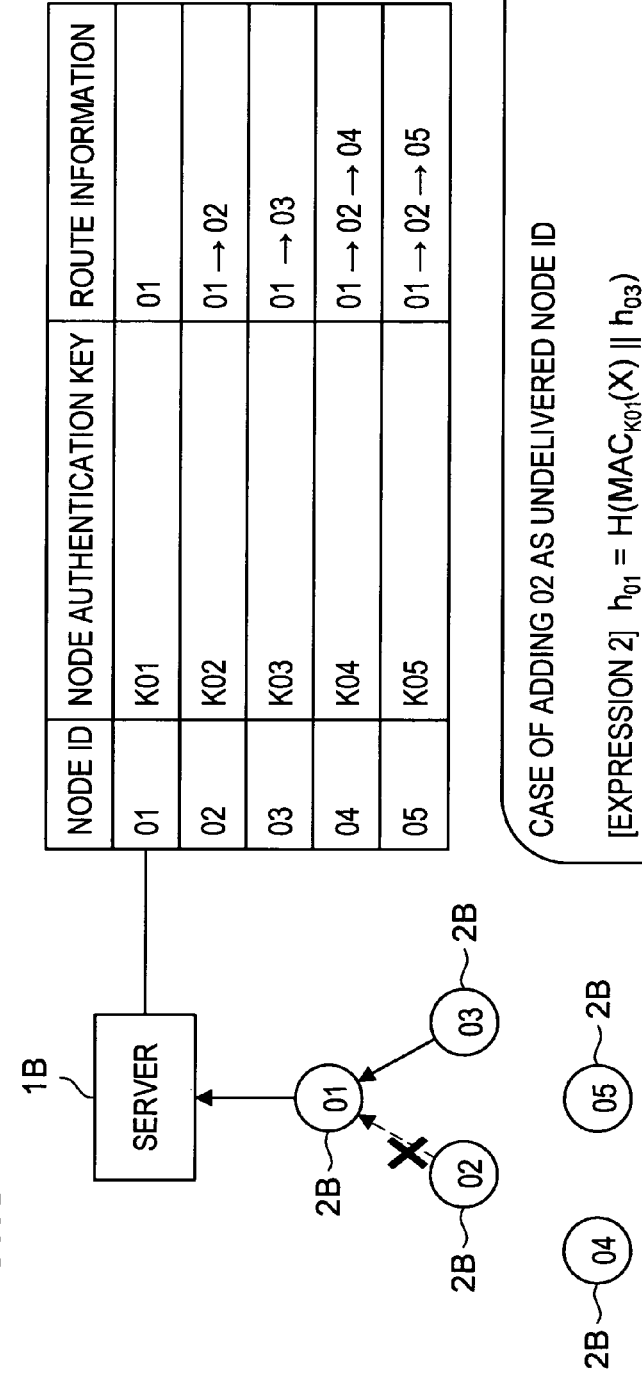
FIG. 10 is an explanatory diagram of an arithmetic expression performed by a reception confirmation information verification part in the server in the second embodiment.

The reception confirmation information verification part 13 in the second embodiment is provided with the reception confirmation information with zero or more undelivered node IDs added from the receiving part 15. To the reception confirmation information with undelivered node ID, for example, the node ID is linked after the reception confirmation information. In the reception confirmation information verification part 13, the reception confirmation information and zero or more undelivered node IDs are extracted in accordance with the bit length preset in the system. When the undelivered node ID exists, for example, it is recognized that the node downstream from the undelivered node including the undelivered node has not reached, as shown in FIG. 10, and the calculation using only the information on the node with the broadcast data having reached is performed, as shown in expression 2 in FIG. 10. According to whether the calculation result in the reception confirmation information verification part 13 matches the reception confirmation information from the receiving part 15, it can be understood that the correct data broadcasted from the server 1B has reached the node other than the undelivered node and the node downstream therefrom, among the nodes managed by the server 1B. When the verification result matches, the reception confirmation information verification part 13 provides the undelivered node ID to the undelivered node ID management part 16.

The undelivered node ID management part 16 holds the undelivered node ID from the reception confirmation information verification part 13. Here, holding ID indicates that it is not understood whether the broadcast data has reached correctly the undelivered node holding ID and the node downstream therefrom or not.

The receiving part 16 provides the reception confirmation information with zero or more undelivered node ID from the adjacent node under management to the reception confirmation information verification part 13.

Figure 9:
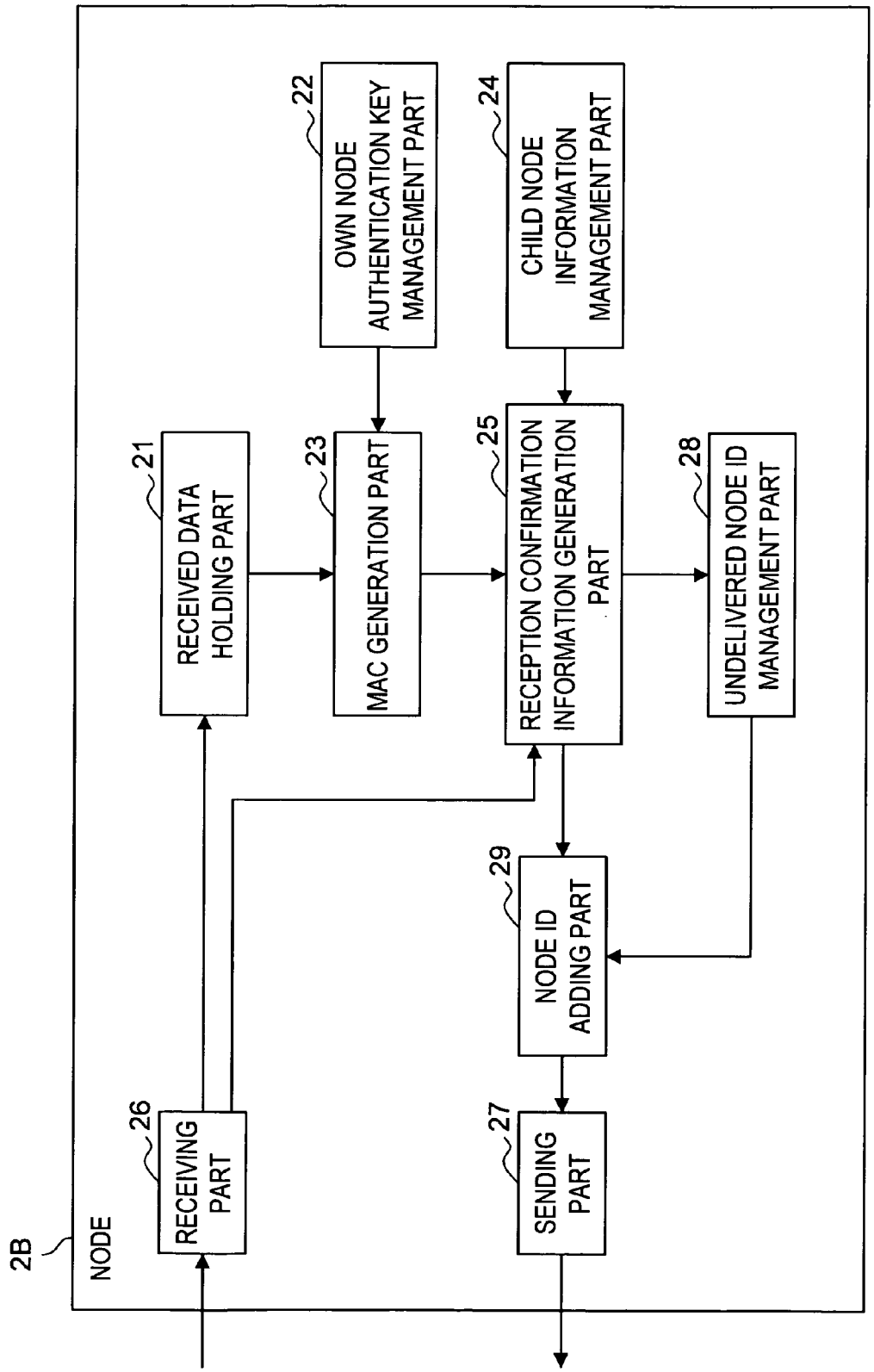
FIG. 9 is a block diagram showing a detailed configuration of a node in the second embodiment.

FIG. 9 is a block diagram showing a detailed configuration of each node (receiver of the broadcast data) 2B in the second embodiment. Same reference numerals are attached to the same and corresponding parts as FIG. 3 in the first embodiment.

The node 2B in the second embodiment includes a received data holding part 21, an own node authentication key management part 22, an MAC generation part 23, a child node information management part 24, a reception confirmation information generation part 25, an undelivered node ID management part 28, a node ID adding part 29, a receiving part 26 and a sending part 27.

Hereinafter, the undelivered node ID management part 28 and the node ID adding part 29 that did not exist in the first embodiment, and the reception confirmation information generation part 25, the receiving part 26 and the sending part 27 that have the functions slightly different from the components in the first embodiment will be described.

With regard to the reception confirmation information generation part 25 in the second embodiment, there will be described the difference from the reception confirmation information verification part in the first embodiment. In the reception confirmation information generation part 25 in the second embodiment, when the undelivered node ID is added to the reception confirmation information of a child node from the receiving part 26, the reception confirmation information from the child node has all undelivered node ID eliminated. In the reception confirmation information with the undelivered node ID added, for example, the node ID is bit-linked after the reception confirmation information. In the reception confirmation information generation part 25, the reception confirmation information and zero or more undelivered node IDs are extracted in accordance with the bit length preset in the system.

When the reception confirmation information generation part 25 is not provided with the reception confirmation information of the child node from the receiving part 26 even after a predetermined time has passed from the time of having relayed and sent the broadcast data to a certain child node, a hash function is performed for the result of linking the MAC from the MAC generation part 23 to zero or more reception confirmation information provided from the receiving part 26, and provides it, as the reception confirmation information of the corresponding node, to the node ID adding part 29. Here, the predetermined time may be set to be a common value in the system or may be set by varying the value according to whether the child node is the router node or the end node, or other factors.

Further, the reception confirmation information generation part 25 provides zero or more undelivered node ID added to the reception confirmation information from the receiving part 26 and zero or more of all child node IDs without the reception confirmation information from the receiving part 26, to the undelivered node ID management part 28.

The undelivered node ID management part 28 manages the undelivered node ID from the reception confirmation information generation part 25. And the undelivered node ID management part 28 provides the undelivered node ID, which is provided from the reception confirmation information generation part 25, to the node ID adding part 29 as required.

The node ID adding part 29 adds zero or more of the undelivered node IDs, which are provided from the undelivered node ID management part 28, to the reception confirmation information of the corresponding node to generate the reception confirmation information from the reception confirmation information generation part 25 with the undelivered node ID. The generated reception confirmation information with the undelivered node ID is provided to the sending part 27. The form of the reception confirmation information with the undelivered node ID is preset in the system.

The receiving part 26 provides the broadcast data from the server 1B to the received data holding part 21, and the reception confirmation information with zero or more undelivered node IDs from the child node to the reception confirmation information generation part 25.

The sending part 27 sends the reception confirmation information with zero or more undelivered node IDs from the node ID adding part 29, to its own parent node (server in the case where the parent is the server).

(B-2) Operation of the Second Embodiment

Next, the operation of the message reception confirmation system in the second embodiment (message reception confirmation method) will be described.

The operation of the message reception confirmation system in the second embodiment consists of roughly three-stage operation (S201 to S203).

Figure 11:
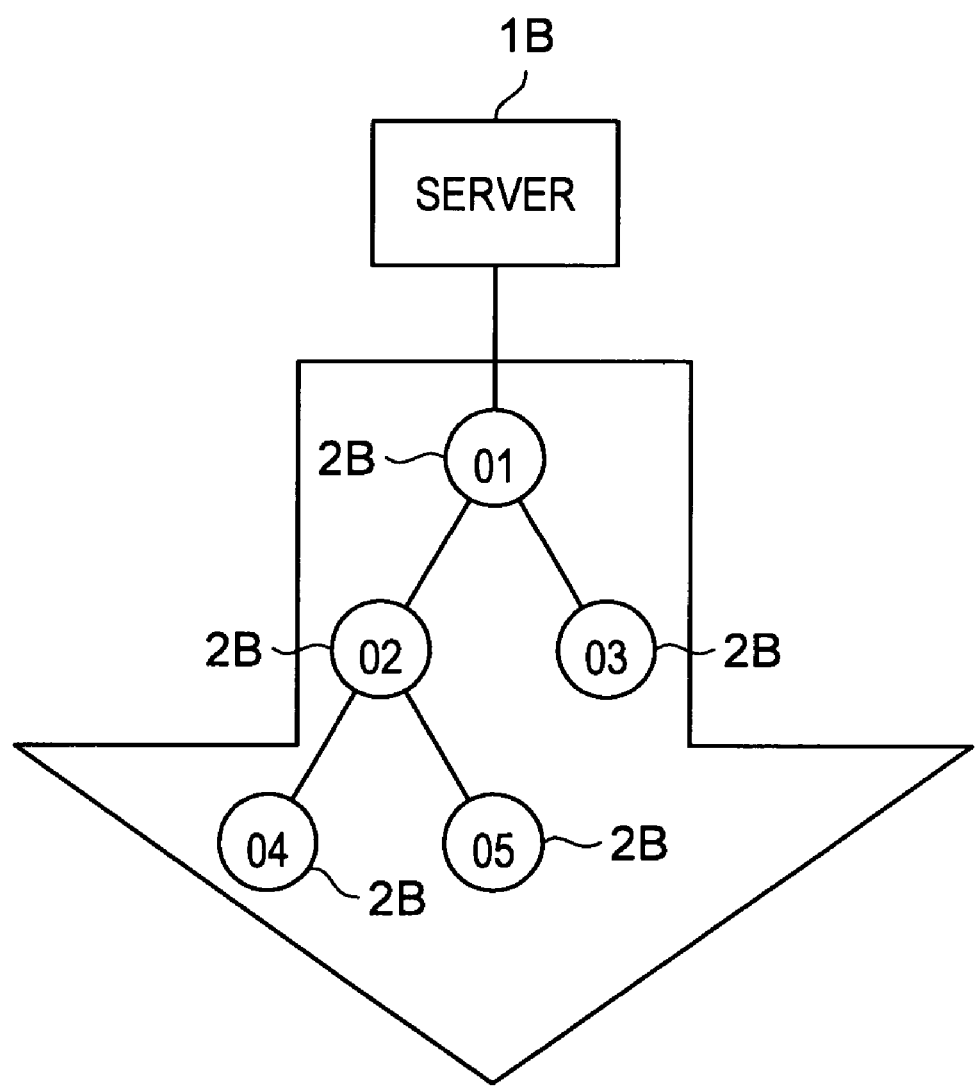
FIG. 11 is an explanatory diagram of an operation in the first stage in the message reception confirmation system in the second embodiment.

First Stage S201 (server broadcasts data) (see FIG. 11)

The server 1B generates broadcast data X in the data generation part 11 and broadcasts to the node 2B under management through the sending part 14.

Figure 12:
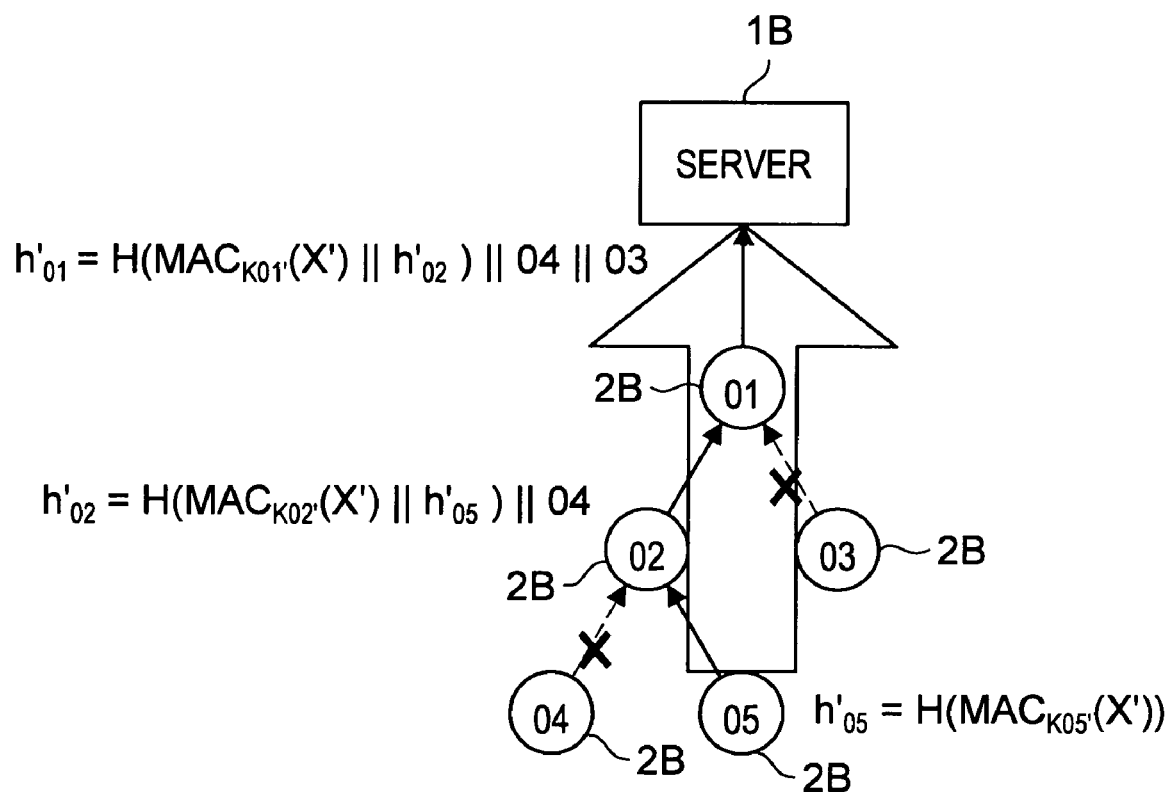
FIG. 12 is an explanatory diagram of an operation in the second stage in the message reception confirmation system in the second embodiment.

Second Stage S202 (node returns reception confirmation information to server while overlapping router node adds ID information of child node that could not receive reception confirmation information to the reception confirmation information) (see FIG. 12)

Each node 2B holds the broadcast data from the server 1B received by the receiving part 26 in the received data holding part 21, and, in the MAC generation part 23, the broadcast data from the server 1B provided by the received data holding part 21 and the authentication key of the corresponding node provided by the own node authentication key management part 22 are input to generate the MAC for the received data and sent the MAC to the reception confirmation information generation part 25.

Each node 2B receives the reception confirmation information with undelivered node ID from the child node, which is provided from the receiving part 26, and provides the reception confirmation information with zero or more undelivered node IDs eliminated to the reception confirmation information generation part 25.

Each node 2B judges in a reception confirmation information generation part 25 whether the node 2B itself is the end node or the router node, based on the information from the child node information management part 24. In the case of being the end node, each node 2B performs the hash function for the MAC from the MAC generation part 23, and sends the hash value, as the reception confirmation information on its own, to the node ID adding part 29. On the other hand, in the case of being the router node, since the reception confirmation information on all child nodes are provided through the receiving part 26, each node 2B sends the hash value in which the result of linking the MAC from the MAC generation part 23 to the reception confirmation information of all child nodes is subjected to the hash function, as the reception confirmation information on its own, to the node ID adding part 29. When the reception confirmation information of the child node is not provided even after a predetermined time has passed from the time of having relayed and sent the broadcast data to a certain child node, a hash function is performed for the result of linking the MAC from the MAC generation part 23 to zero or more reception confirmation information provided to generate the hash value, and provides it, as the reception confirmation information of the corresponding node, to the node ID adding part 29. When the undelivered node ID is added to the reception confirmation information from the child node or the child node without the reception confirmation information exists, the node ID is provided to the undelivered node ID management part 28.

In the node ID adding part 29, each node 2B is provided with zero or more undelivered node IDs from the undelivered node ID management part 28, and adds the undelivered node ID to the reception confirmation information of the corresponding node from the reception confirmation information generation part 25, to generate the reception confirmation information with the undelivered node ID, which is sent from the sending part 27 to the parent node.

In the node of ID 02 in FIG. 12, for example, since the reception confirmation information does not reach from a child node 04 even after the predetermined time, the reception confirmation information generation part 25 performs the hash function for the result of linking the MAC from the MAC generation part 23 to the reception confirmation information of all child nodes (here, only the node 05) to generate the hash value, and sends the hash value, as the reception confirmation information, to the node ID adding part 29. And the node ID adding part 29 links the undelivered node ID 04 to the reception confirmation information (the above-mentioned hash value), and sends, as reception response information, from the sending part 27 to the parent node (node 01).

Also in the node of ID 01, for example, since the reception confirmation information a child node 02 has the undelivered node ID 04 added, the undelivered node ID 04 is separated from the reception confirmation information. On the other hand, since the reception confirmation information does not reach from a child node 03 even after the predetermined time, the reception confirmation information generation part 25 performs the hash function for the result of linking the MAC from the MAC generation part 23 to the reception confirmation information of all child nodes (here, only the node 02) to generate the hash value, and sends the hash value, as the reception confirmation information, to the node ID adding part 29. And the node ID adding part 29 links the undelivered node IDs 03 and 04 to the reception confirmation information (the above-mentioned hash value), and sends, as the reception response information, from the sending part 27 to the parent node (node 01).

Figure 13:
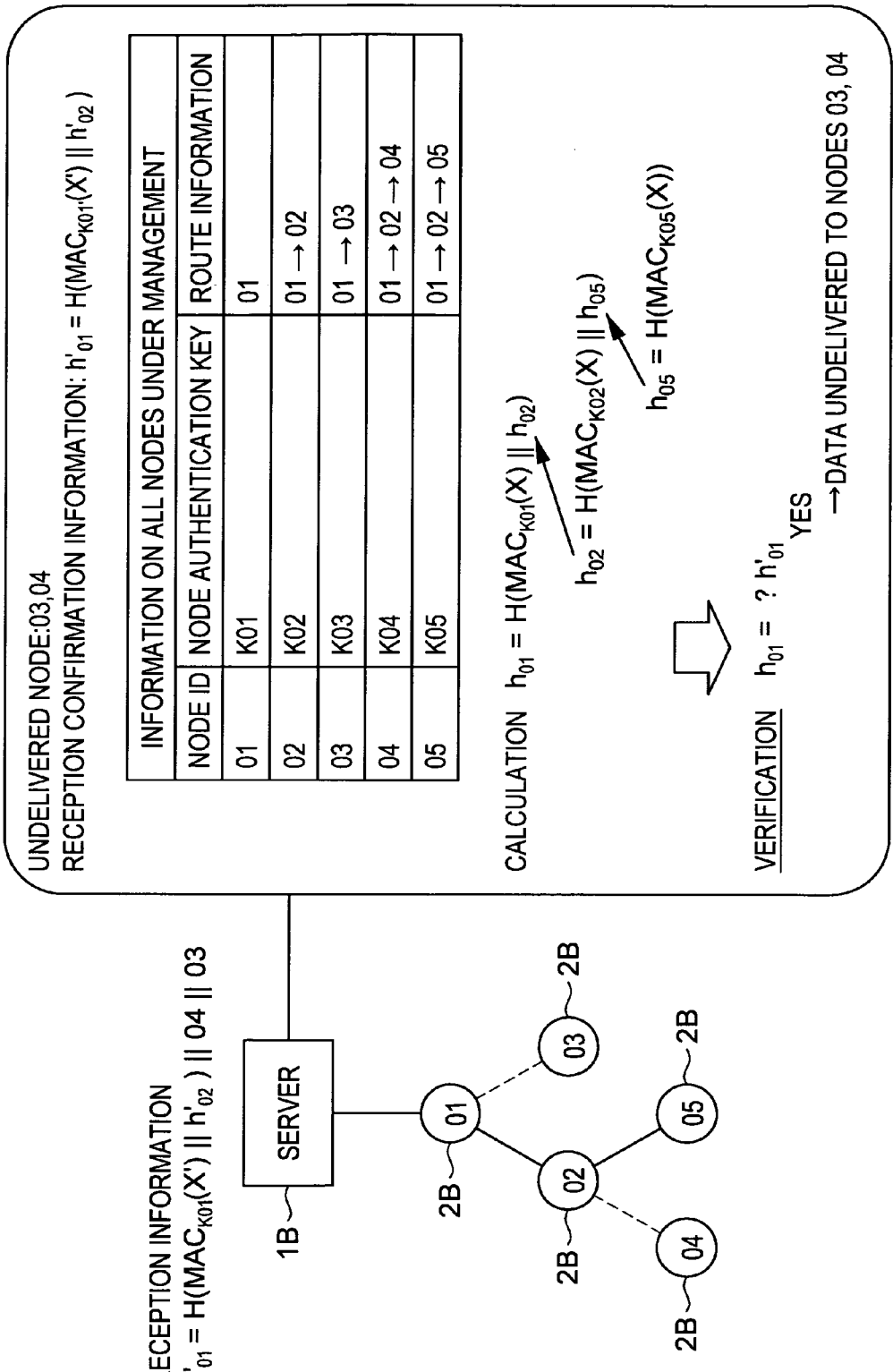
FIG. 13 is an explanatory diagram of an operation in the third stage in the message reception confirmation system in the second embodiment.

Third Stage S203 (server calculates reception confirmation information assumed to be returned in the case of eliminating undelivered node. Server verifies reception confirmation information) (see FIG. 13)

In the reception confirmation information verification part 13, the server 1B extracts the reception confirmation information and all undelivered node IDs from the reception confirmation information with zero or more undelivered node IDs from the receiving part 15.

In the reception confirmation information verification part 13, the server 1B calculates the reception confirmation information assumed to be returned from the adjacent node, based on the broadcast data from the data generation part 11, the node ID, node authentication key and route information from the node information management part 12, and the undelivered node ID extracted. Then the server 1B verifies whether the reception confirmation information calculated matches the reception confirmation information from the adjacent node provided from the receiving part 15. Obtaining the verification result as matching, the server 1B manages the undelivered node ID in the undelivered node ID management part 16.

(B-3) Advantage of the Second Embodiment

Also according to the second embodiment, the same advantage as in the first embodiment can be attained and the following advantage can be attained.

According to the second embodiment, the server can detect the node possibly with the data undelivered.

Also, the server can recognize whether the data broadcasted by the server itself has reached correctly the node other than the node having the ID added to the reception confirmation information and the nodes downstream therefrom or not.

Further, the server can recognize whether the reception confirmation information from the node having the ID added to the reception confirmation information cannot be obtained for some reason or not. For example, with failure or unauthorized location change, the server can detect the node without response of the reception confirmation information.

(C) Another Embodiment

Although various modified embodiments have been referred in the descriptions of the above embodiments, the following modified embodiments can be exemplified.

Although, in the above embodiments, there has been described the case where the number of nodes adjacent to the server is one, in order to simplify the description, the configuration is not limited to this example. Also in the case where the plural nodes are adjacent to the server, the server may verify the reception confirmation information received from each of the adjacent nodes.

Figure 14:
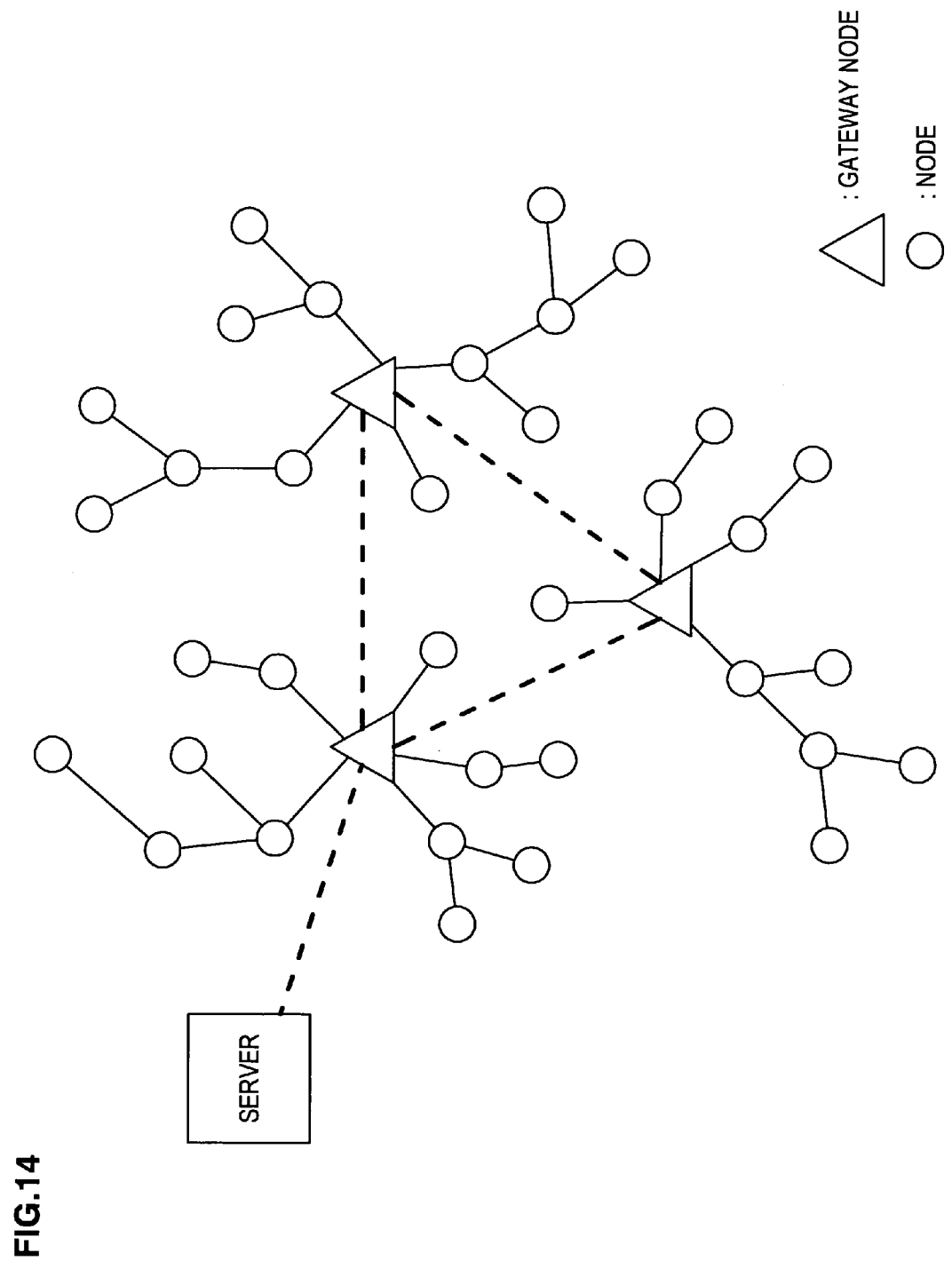
FIG. 14 is an explanatory diagram showing another configuration example of a network to which the message reception confirmation system in the present invention is applicable.

Also in the above embodiments, although there has been described the example where the server is directly linked to the node, in order to simplify the description, the configuration is not limited to this example. As the form of sensor network, it is general that the node to be a gateway exists between the server and the node, as shown in FIG. 14. The gateway node in FIG. 14 may verify the reception confirmation information by sending the data as the server did in the above embodiments, or may verify the reception confirmation information received through the gateway node by sending the data to the node through the gateway node from the server in FIG. 14.

When the data sender and the verifier of reception confirmation information are reliable each other and a secure route is configured therebetween, the data sender and the verifier of reception confirmation information do not have to be included in the same terminal. For example, there may be configured that the gateway node in FIG. 14 sends the data and the received reception confirmation information is verified in the server, to receive the report on the result.

In the above embodiments, although there has been described the example of broadcasting data, the present invention can be applied to the case of multicasting. In this case, it is also possible to regard the case as valid where the undelivered node information in the second embodiment includes only the information on the node other than a destination node.

What is claimed is:

1. A message reception confirmation method in which a message sending device obtains a reception confirmation of a message sent to a particular message receiving device under a multihop communication environment, comprising:
   a first step of holding information in the particular message receiving device;
   a second step of sending the message from the message sending device;
   a third step of the particular message receiving device's generating reception authentication information of the message;
   a fourth step of the particular message receiving device's generating a hash value as a reception confirmation information of the message by using the reception confirmation information of at least one other message receiving device, if any, and the reception authentication information of the message as an input;
   a fifth step of the particular message receiving device's sending the reception confirmation information of the message to a reception confirmation information verification device;
   a sixth step of the reception confirmation information verification device's verifying the reception confirmation information received; and
   a seventh step of the message sending device's obtaining the reception confirmation of the particular message to the message receiving device based on the result of verification in the sixth step,
   wherein the information held in the first step includes:
      information for discriminating each message receiving device;
      an authentication key that is shared by the communications terminal and each message receiving device one-to-one, in order to authenticate each message receiving device; and
      route information from each message receiving device to the communications terminal.

2. A communications terminal for verifying reception confirmation information that is sent from a particular message receiving device and that indicates whether a message sent from a message sending device is received by the particular message receiving device under a multihop communication environment, comprising:
   a receiving device information managing part for managing information of the particular message receiving device;
   a receiving part for receiving the reception confirmation information; and
   a verifying part for verifying the reception confirmation information received,
   wherein the verifying part understands an authentication key of all message receiving devices verifying the reception confirmation and by what route the reception confirmation information generated by each message receiving device are sent, based on the sent message, the authentication key of each message receiving device and route information, calculates the reception confirmation information assumed to be received in the same manner as that each message receiving device generates the reception confirmation information, and judges whether the reception confirmation information calculated corresponds to the reception confirmation information received, and
   wherein the receiving device information managing part holds:
      information for discriminating each message receiving device;
      the authentication key, wherein the authentication key is shared by the communications terminal and each message receiving device one-to-one, in order to authenticate each message receiving device; and
      route information from each message receiving device to the communications terminal.

3. A communications terminal according to claim 2, comprising an undelivered receiving device information managing part for managing discrimination information of the message receiving device in which the reception of the message cannot be confirmed.

4. A communications terminal corresponding to a particular message receiving device for receiving a message sent from a message sending device and for generating reception confirmation information under a multihop communication environment, the particular message receiving device being one of a plurality of message receiving devices in a network, comprising:
   a receiving part for receiving the message;
   a reception authentication information generating part for generating reception authentication information of the message;
   an adjacent device information managing part for managing information of an adjacent message receiving device;
   a reception confirmation information generating part for generating the reception confirmation information of the message; and
   a reception confirmation information sending part for sending the reception confirmation information,
   wherein the reception confirmation information generating part generates a hash value as the reception confirmation information of the message by setting the reception confirmation information of at least one other message receiving device, if any, and the reception authentication information of the communications terminal as an input, and
   wherein the communication terminal holds information for discriminating each message receiving device, an authentication key that is shared by the communications terminal and each message receiving device, and route information from each message receiving device to the communication terminal,
   wherein the reception authentication information generating part generates the reception authentication information of the message by using the message received and an authentication key shared with a communications terminal on a reception confirmation information verification side, and wherein the reception authentication information generating part generates a MAC for the message as the reception authentication information of the message by using the authentication key shared with the communications terminal on a reception confirmation information verification side.

5. A communications terminal according to claim 4, wherein the adjacent device information managing part is capable of understanding whether an adjacent message receiving device is an end node or a router node in a tree structure providing a multihop communication environment, and manages discrimination information of the adjacent message receiving device to be a child node and information indicating whether the node is a router node or an end node.

6. A communications terminal according to claim 4, wherein the reception confirmation information generating part uses the reception confirmation information of at least one other message receiving device, if any, for generating the reception confirmation information of the message, and the reception confirmation information of at least one other message receiving device, if any, is generated by the message receiving device as the child node in the tree structure providing a multihop communication environment.

7. A message reception confirmation system comprising:
a plurality of message receiving devices for receiving a message; and
a communications terminal for verifying reception confirmation information that is sent from the message receiving devices under a multihop communication environment,
wherein each receiving device information managing part holds:
information for discriminating each message receiving device;
an authentication key, wherein the authentication key is shared by the communications terminal and each message receiving device one-to-one, in order to authenticate each message receiving device; and
route information from each message receiving device to the communications terminal;
wherein each message receiving device includes:
a receiving part for receiving the message;
a reception authentication information generating part for generating reception authentication information of the message;
an adjacent device information managing part for managing information of an adjacent communications terminal;
a reception confirmation information generating part for generating the reception confirmation information of the message, the reception confirmation information generating part generating a hash value as the reception confirmation information of the message by setting the reception confirmation information of at least one other message receiving device, if any, and the reception authentication information of the communications terminal as an input; and
a reception confirmation information sending part for sending the reception confirmation information; and
wherein the communications terminal includes:
a receiving device information managing part for managing information of the message receiving devices;
a receiving part for receiving the reception confirmation information; and
a verifying part for verifying the reception confirmation information received.

8. A communications terminal corresponding to a particular message receiving device for receiving a message sent from a message sending device and for generating reception confirmation information under a multihop communication environment, the particular message receiving device being one of a plurality of message receiving devices in a network, comprising:
a receiving part for receiving the message;
a reception authentication information generating part for generating reception authentication information of the message;
an adjacent device information managing part for managing information of an adjacent message receiving device;
a reception confirmation information generating part for generating the reception confirmation information of the message; and
a reception confirmation information sending part for sending the reception confirmation information,
wherein the reception confirmation information generating part generates a hash value as the reception confirmation information of the message by setting the reception confirmation information of at least one other message receiving device, if any, and the reception authentication information of the communications terminal as an input,
wherein the communication terminal holds information for discriminating each message receiving device, an authentication key that is shared by the communications terminal and each message receiving device, and route information from each message receiving device to the communication terminal,
wherein the reception confirmation information generating part generates the reception confirmation information of the message by using the reception confirmation information of at least one other message receiving device, if any, and the reception authentication information of the communications terminal, and
wherein the reception confirmation information generating part uses the reception confirmation information of at least one other message receiving device, if any, for generating the reception confirmation information of the message, and the reception confirmation information of at least one other message receiving device, if any, is generated by the message receiving device as the child node in the tree structure providing a multihop communication environment.

9. A communications terminal corresponding to a particular message receiving device for receiving a message sent from a message sending device and for generating reception confirmation information under a multihop communication environment, the particular message receiving device being one of a plurality of message receiving devices in a network, comprising:
a receiving part for receiving the message;
a reception authentication information generating part for generating reception authentication information of the message;
an adjacent device information managing part for managing information of an adjacent message receiving device;
a reception confirmation information generating part for generating the reception confirmation information of the message; and
a reception confirmation information sending part for sending the reception confirmation information, wherein the reception confirmation information generating part generates a hash value as the reception confirmation information of the message by setting the reception confirmation information of at least one other message receiving device, if any, and the reception authentication information of the communications terminal as an input, wherein the communication terminal holds information for discriminating each message receiving device, an authentication key that is shared by the communications terminal and each message receiving device, and route information from each message receiving device to the communication terminal, wherein the communication terminal further comprises a node discrimination information adding part for adding node discrimination information for other message receiving devices, wherein the node discrimination information adding part sends the reception confirmation information of the communications terminal with zero or more of node discrimination information added, and wherein zero or more of the node discrimination information added to the reception confirmation information of the communications terminal is the discrimination information of the child node in which the message receiving device cannot obtain the reception confirmation information in the message receiving devices as the child nodes in the tree structure providing a multihop communication environment.

10. The method of claim 1, where in the third step is conducted using the message received by the particular message receiving device and the authentication key.

* * * * *